(12) United States Patent
Schwarz

(10) Patent No.: US 6,198,372 B1
(45) Date of Patent: Mar. 6, 2001

(54) PLASTIC-BONDED RING MAGNET

(75) Inventor: Manfred Schwarz, Wipperfürth (DE)

(73) Assignee: Max Baermann GmbH (DE)

( * ) Notice: Subject to any disclaimer, the term of this patent is extended or adjusted under 35 U.S.C. 154(b) by 0 days.

(21) Appl. No.: 09/387,766

(22) Filed: Sep. 1, 1999

(30) Foreign Application Priority Data

Sep. 8, 1998 (DE) .............................................. 198 40 914

(51) Int. Cl.$^7$ ...................................................... H01F 7/02
(52) U.S. Cl. ........................................... 335/302; 310/156
(58) Field of Search .................... 335/302–306; 310/156, 43

(56) References Cited

U.S. PATENT DOCUMENTS

| 4,981,635 | * | 1/1991 | Yamashita et al. | 264/112 |
| 5,565,721 | * | 10/1996 | Knappe | 310/156 |
| 5,695,318 | * | 12/1997 | Harmsen | 415/218.1 |

FOREIGN PATENT DOCUMENTS

| 687 560 | 2/1940 | (DE) . |
| 1 043 540 | 7/1954 | (DE) . |
| 965 464 | 6/1957 | (DE) . |
| 1 804 397 | 1/1960 | (DE) . |
| 86 14 601 | 9/1986 | (DE) . |
| 44 43 655 C1 | 4/1996 | (DE) . |
| 64480405 | 8/1986 | (EP) . |

OTHER PUBLICATIONS

JP 61–35501, Patent Abstracts of Japan, vol. 10, No. 192 (Jul. 5, 1986).

* cited by examiner

Primary Examiner—Lincoln Donovan
(74) Attorney, Agent, or Firm—Nixon and Vanderhye P.C.

(57) ABSTRACT

A plastic-bonded ring magnet (1) with a ring-shaped basic body (2) for fixing the magnet (1) onto a shaft is laid out in such a way that the magnet (1) is essentially located at the front (11) of the basic body (2), the inside diameter of the basic body (2) being smaller than the one of the magnet and the outside diameter of the basic body (2) and the magnet (1) being essentially identical. In particular for the purpose of improving the safety against torsion of the magnet (1) on the basic body (2) and facilitating the injection-moulding manufacture of the magnet (1) on the basic body (2), the basic body (2) shows at least one axially oriented, channel-shaped recess (5) which is filled with magnetic material.

10 Claims, 1 Drawing Sheet

PLASTIC-BONDED RING MAGNET

FIELD OF THE INVENTION

The invention relates to a plastic-bonded ring magnet with a ring-shaped basic body for fixing the magnet to a shaft, with the magnet being essentially located at a front of the basic body, the inside diameter of the basic body being smaller than the one of the magnet and the outside diameter of the basic body and the magnet being essentially identical.

BACKGROUND AND SUMMARY OF THE INVENTION

Ring magnets of the kind as stated above are being applied e.g. as motor magnets, with the basic body holding the magnet being fixed to a motor shaft by means of press fit. When designing the basic body and the magnet, it should be taken into consideration that—if at all possible—no tensions should be transmitted to the ring magnet due to press fitting the basic body onto the shaft in order to avoid its tearing off the basic body. A known measure to avoid a direct transmission of radial tensions from the shaft to the ring magnet is to lay out the inside diameter of the basic body smaller than the one of the magnet. Further, the basic body is laid out in such a way due to its material, e.g. plastic material, and its design, e.g. axially running openings, that a transmission of tensions via the basic body to the ring magnet can be avoided to a large extent.

For injection-moulding reasons, the outside diameter of the basic body corresponds to the one of the ring magnet in order that the magnet can be injected via a core to the basic body in a mould corresponding to the inside diameter.

The application of the ring magnet as a motor magnet involves the requirement to locate the ring magnet at the basic body in such a way that safety against torsion and axial shifting is guaranteed. For this purpose, frictional and/or positive connections are required, as glued connections do not guarantee a permanent safe fixing. In this respect, known designs are insufficient and not adequate at all.

From DE-PS 687 560 a rotor is known the ring-shaped magnet body of which is mounted onto a steel bush with which it is joined by welding at conically designed edges. The steel bush with the magnet body are secured against torsion on a shaft by means of a key.

JP 61-35501(A) in Patents Abstracts of Japan E-417 of Jul. 5, 1986, Vol. 10/No. 192, shows a cylinder-shaped basic body with grooves running in vertical direction which is axially inserted into the boring of a ring magnet. Before and after inserting, the magnet is coated for the purpose of increasing its mechanical strength.

In DE-GM 1 804 397, a ring magnet is described which is located on a ring-shaped basic body held by keys. This is achieved by using either a ring-shaped key which is indented into the appropriate recess of the basic body deforming it in such a way that the basic body is pressed to a shaft as well as to the magnet. In another version, the basic body consists of two intermeshing ring-shaped keys which tightly connect the magnet with the shaft by means of mutual pressing.

DE-AS 1 043 540 and DE-PS 965 464 show ring magnets which are fixed by means of glueing onto a bush extending along a part of the axial groove of the magnet. The glued connection does not guarantee a permanent safe fixing of the magnet to the bush.

Therefore, the invention is based on the task to create a positive connection between the ring magnet and the basic body which guarantees in particular an improved safety against torsion of the ring magnet on the basic body by injecting the ring magnet in a simple way to the basic body.

The task is solved as per the invention in such a way that at a plastic-bonded ring magnet with a ring-shaped basic body of the kind as described in the beginning, the basic body shows at least one axially directed channel-shaped recess which is filled with magnetic material.

On the one hand the axially continuous recess, which is provided in the basic body and into which the ring magnet extends with an appropriately shaped part, offers a sufficient safety against torsion of the magnet on the basic body. On the other hand, the magnetic material for manufacturing the magnet, which is fluid in heated state, can be injected through the recess into the hollow space of the mould, a fact which proved to simplify the injection-moulding manufacture of the ring magnet.

The recess may partly or fully be filled with magnetic material. At the end opposite to the hollow space of the mould, the recess advisably shows an area which serves as an injecting aid and is not filled with magnetic material after injection-moulding. This area may show a widening which is adjusted to the injection nozzle.

With an advantageous further development of the invention, the recess shows a tapering of the cross section towards the ring magnet. Due to the part of the ring magnet which is located in the tapering of the cross section and adjacent to the vicinal front of the basic body, safety against torsion as well as axial shifting of the magnet on the basic body is guaranteed.

In a preferred further development of the invention, the recess is opened towards the circumferential surface of the basic body. In this case it forms a continuous channel extending axially along the circumference. The part of the ring magnet extending into this channel, shows a surface in accordance with the outside diameter of the basic body which is subject to the injection-moulding form.

With this version, the above mentioned tapering of the cross section may be laid out in such a way that the wall areas of the recess adjoining the circumferential surface of the basic body run up to each other towards the ring magnet.

Further or on the other hand it may be provided that the radial inside wall area of the opening which is formed at the outside of the basic body, inclines in axial direction towards the circumferential surface. The conicality in radial direction, brings about a safety against shifting of the magnet on the basic body, too.

The angles of the lateral wall areas running up to each other and/or the radially inclined wall area of the recess are chosen in such a way that with the cooling of the magnetic material after injection-moulding no contraction strains occur which may lead to the magnet tearing off in the area extending into the recess.

In a preferred version, the recess at the outside of the basic body shows a essentially U-shaped cross section which is narrowed by foot-shaped areas at the circumference surface of the basic body. This narrowing guarantees a safety of the magnetic material extending into the recess against the centrifugal forces occurring with high rotational speed of the ring magnet.

For technical reasons of injection-moulding, the number of recesses and their layout can be determined by the number of poles and/or their layout. A two-pole magnet for instance would preferrably be provided with two diametrally opposite recesses.

In a suitable further development of the invention, the basic body shows at its front facing the magnet a essentially cylindrical projection representing further safety against torsion. The safety against torsion preferably consists of a flattening which suitably is facing the recess in order that it can cover a sufficient cross section surface.

It is advisable not to use the projection for press fitting of the basic body onto the shaft. For this reason, the inside diameter of the projection is slightly bigger than the one of the remaining basic body. It can correspond to the inside diameter of the magnet so that during its injection-moulding manufacture the core extends into the cylinder-shaped projection.

Advantageously, the inside diameter of the projection is continuing slightly into the remaining basic body in order that it shows an accordingly larger inside diameter at its end facing the ring magnet. By means of this measure, the transmission of axially oriented tensions via the basic body, which is press-fitted onto the shaft, to the ring magnet is avoided to a large extent.

A preferred version of the invention is further specified as per the following drawing.

DETAILED DESCRIPTION OF THE PREFERRED EMBODIMENTS

Figure 1:
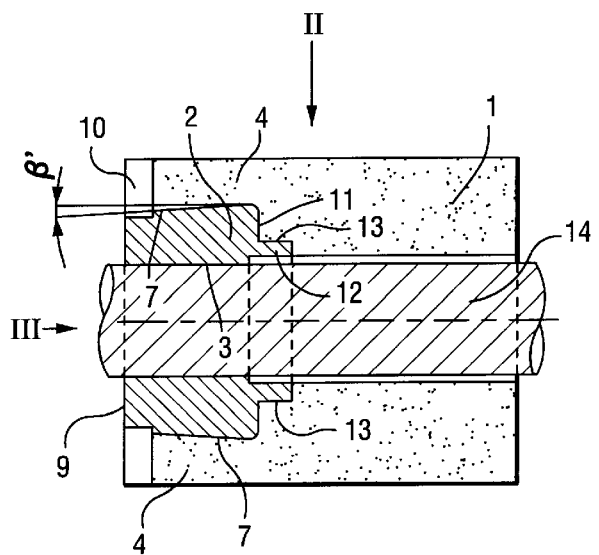
FIG. 1 An axial section across a ring magnet with ring-shaped basic body.

As can be gathered from the drawing, the plastic-bonded ring magnet 1 is formed at a ring-shaped basic body 2 which can be fixed to a shaft 14 by frictional connection in the press fitting area extending along its inside wall. The ring magnet is essentially located at the front of the basic body 2 and extends with two stud-shaped parts 4 through two recesses 5 located diametrally opposite at the outside of the basic body 2. In the press-fitting area 3, the inside diameter of the basic body 2 is smaller than the one of the magnet 1, with the outside diameter of the basic body 2 and the magnet 1 being essentially identical.

Figure 2:
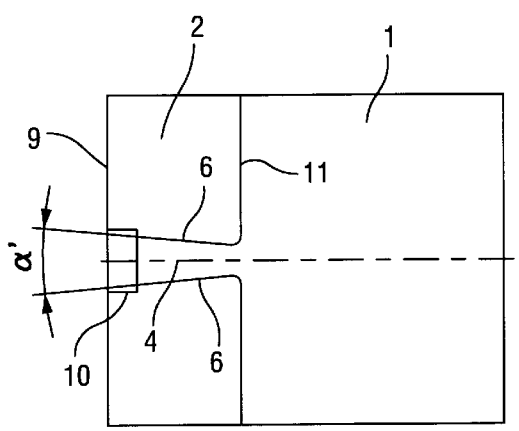
FIG. 2 A top view of the ring magnet with basic body into the direction of arrow II in FIG. 1, FIG. 3 A front view of the ring magnet with basic body into the direction of arrow III in FIG. 1 and FIG. 4 An enlarged view of the area marked with IV in FIG. 3.

As can be seen in particular from FIGS. 1 and 2, the recesses 5 extend into axial direction at the outside of the essentially cylindrical basic body 2. The wall areas 6 of the recesses adjoining the circumferential surface of the basic body run up to each other towards the ring magnet 1 and include the angle α as drawn in FIG. 2. Further, the radial inside wall area 7 of the recess runs in axial direction inclined towards the circumferential surface of the basic body. With the axial direction, it includes the angle β as drawn in FIG. 1. The conicality of the recesses 5 and/or the stud-shaped parts 4 in circumferential as well as radial direction, brings about an axial safety against shifting of the magnet 1 on the basic body 2.

Figure 3:
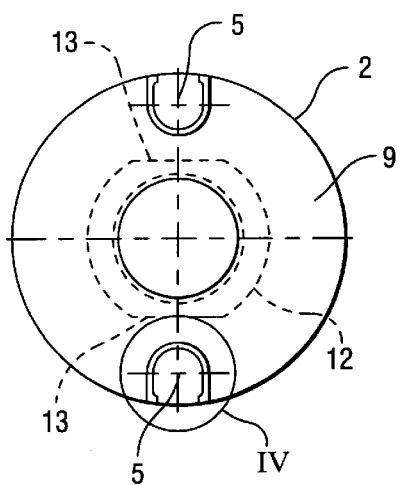
Figure 4:
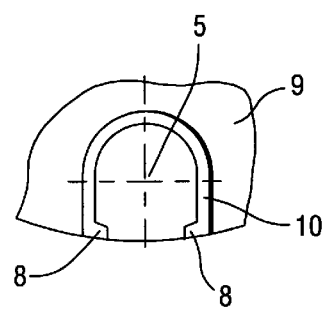

As can be seen in particular from FIGS. 3 and 4, the recesses 5 and/or stud-shaped parts 4 of the ring magnet 1 show a U-shaped cross section which is narrowed by foot-shaped areas 8 at the circumferential surface of the basic body 2. The foot-shaped areas 8 prevent a radial drifting of the stud-shaped parts 4 due to centrifugal forces occurring with high rotational speed of the ring magnet 1.

The recesses 5 show a widening 10 at the front 9 opposite to the ring magnet 1 which serves as an injecting aid during the injection-moulding manufacture of the ring magnet 1. The widening is essentially cylinder-shaped and adjusted to the injection nozzle. As can be seen from FIG. 1, it is not filled with magnetic material.

As can be seen in particular from FIG. 1, the basic body 2 shows at the front 11 facing the ring magnet 1 a essentially cylindrical projection 12 with two flattenings 13 facing the recesses 5. the flattenings 13 and the recesses 5 serve as a safety against torsion when injection-moulding around the basic body 2 with the ring magnet 1.

As can be seen from FIG. 1, the pressing area 3 of the basic body 2 does not extend into the projection 12, but ends at a distance before the front 11. It is followed by a step-shaped widening of the inside diameter of the basic body which merges into the projection 12. The inside diameter of the widening corresponds to the one of the ring magnet 1. Due to the fact that the areas of the basic body 2 adjoining the front of the ring magnet 1 are laid out in axial distance from the pressing area 3, axial components of the tensions which occur by press fitting the basic body 2 to the shaft are not fully transmitted to the ring magnet 1.

Due to the design of the ring magnet 1 and the basic body 2, the injection-moulding manufacture of the magnet 1 onto the basic body 2 is facilitated. The basic body is surrounded by a mould which fits closely at its outside surface and is cylinder-shaped at the inside. The core located inside the mould extends into the projection 12 along the widened area of the inside diameter of the basic body. The plastic-bonded magnetic material, which is plastical when heated, is being injected from the front 9 of the basic body through the recesses 5 into the hollow space of the mould. For reasons of design it needs to be observed that the angles α and β specifying the conicality of the recesses and/or the stud-shaped parts of the magnet are measured in such a way that the stud-shaped parts 4 do not tear off in the transition area to the much larger volume of the ring magnet due to contractual strains which occur during cooling of the magnetic material. In this way, a cylinder-shaped unit of ring magnet 1 and basic body is achieved which can be fixed to a shaft by means of frictional press fitting.

Reference list
1 Plastic-bonded ring magnet
2 Basic body
3 Pressing area
4 Stud-shaped part
5 Recesses
6 Wall area
7 Wall area
8 Foot-shaped part
9 Front
10 Widening
11 Front
12 Projection
13 Flattening

What is claimed is:

1. The combination comprising a plastic-bonded ring magnet and a ring-shaped basic body adapted to fix the magnet onto a shaft which penetrates through the magnet and the basic body, wherein each of said ring magnet and ring-shaped basic body respectively includes an outer surface which establishes an outside diameter, and an inner surface which establishes an inside diameter, and a pair of separated fronts;

said ring magnet being located at a first one of said fronts of said basic body;

said inside diameter of the basic body being smaller than the inside diameter of the ring magnet, and the respective outside diameters of the basic body and the ring magnet being substantially identical to one another, and wherein the basic body includes at least one axially oriented channel-shaped recess extending between both said fronts of the basic body and which defines an inside wall; and wherein said recess is filled with magnetic material.

2. The combination of claim 1, wherein the recess has a cross-section which narrows in a direction towards the ring magnet.

3. The combination of claim 1 or 2, wherein the recess is open towards the outer surface of the basic body, wherein at least some part of the inside wall of the recess adjoins the outside surface of the basic body and another part of inside wall of the recess remain radially inside the basic body.

4. The combination of claim 3, wherein said at least some part of the inside wall of the recess adjoining the outside surface of the basic body includes opposed parts thereof which converge toward one another in a direction towards the ring magnet.

5. The combination of claim 1, wherein a portion of the inside wall of the recess is radially inside the basic body and inclined in an axial direction to the outer surface of the basic body.

6. The combination of claim 1, wherein the recess at a second front of the basic body opposite to the ring magnet is provided with a widened region.

7. The combination of claim 3, wherein the recess has a U-shaped cross-section having legs which extend towards, and open to, the outside surface of the basic body, and wherein terminal ends of the legs include foot-shaped areas.

8. The combination of claim 1, wherein the basic body includes a pair of diametrically opposed said recesses.

9. The combination of claim 1, wherein the basic body at said first one of said fronts includes a substantially cylindrical projection defining an inside diameter and having flattened region facing the recess.

10. The combination of claim 9, wherein the inside diameter of the projection is substantially identical to the inside diameter of the magnet.

\* \* \* \* \*